L. S. PFOUTS.
PASTEURIZER.
APPLICATION FILED APR. 7, 1909.
937,327.
Patented Oct. 19, 1909.
3 SHEETS—SHEET 3.
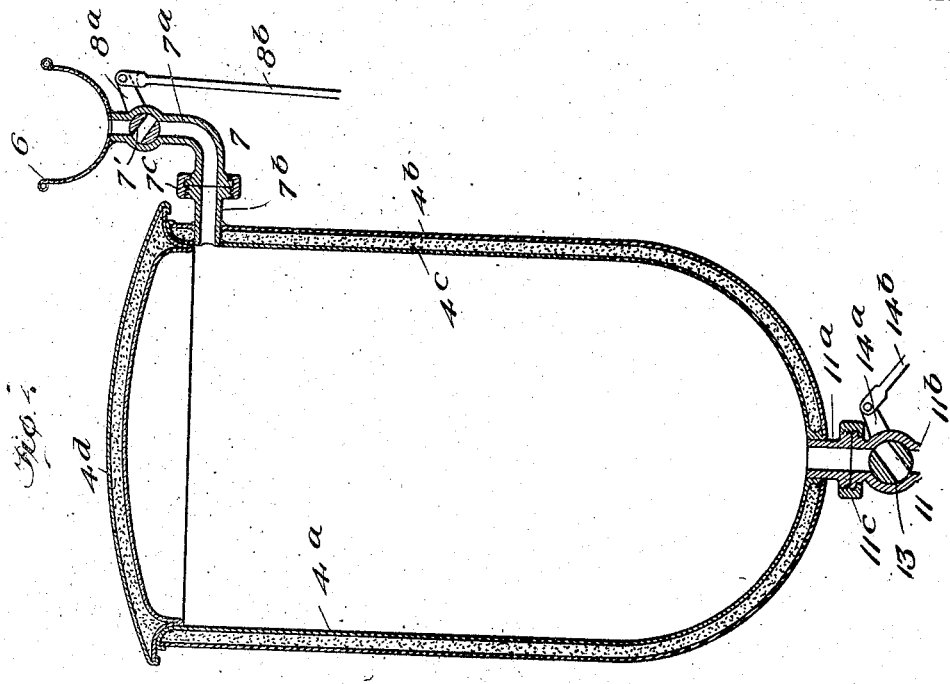
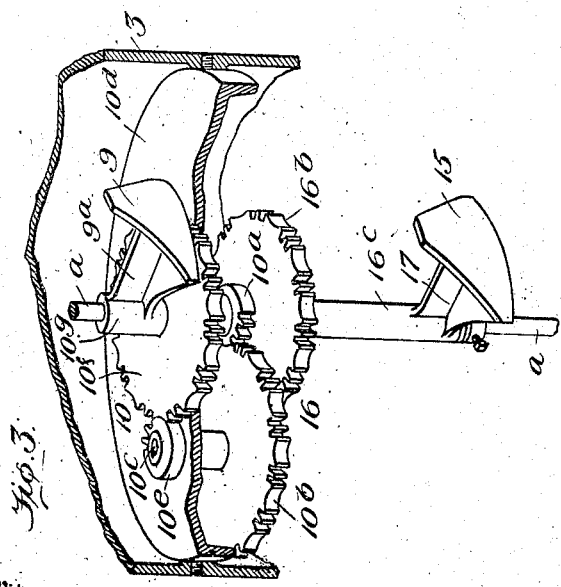
Witnesses
Edwin L. Bradford
C. C. Wright
Inventor
Leroy S. Pfouts
By Edward R. Alexander
Attorney

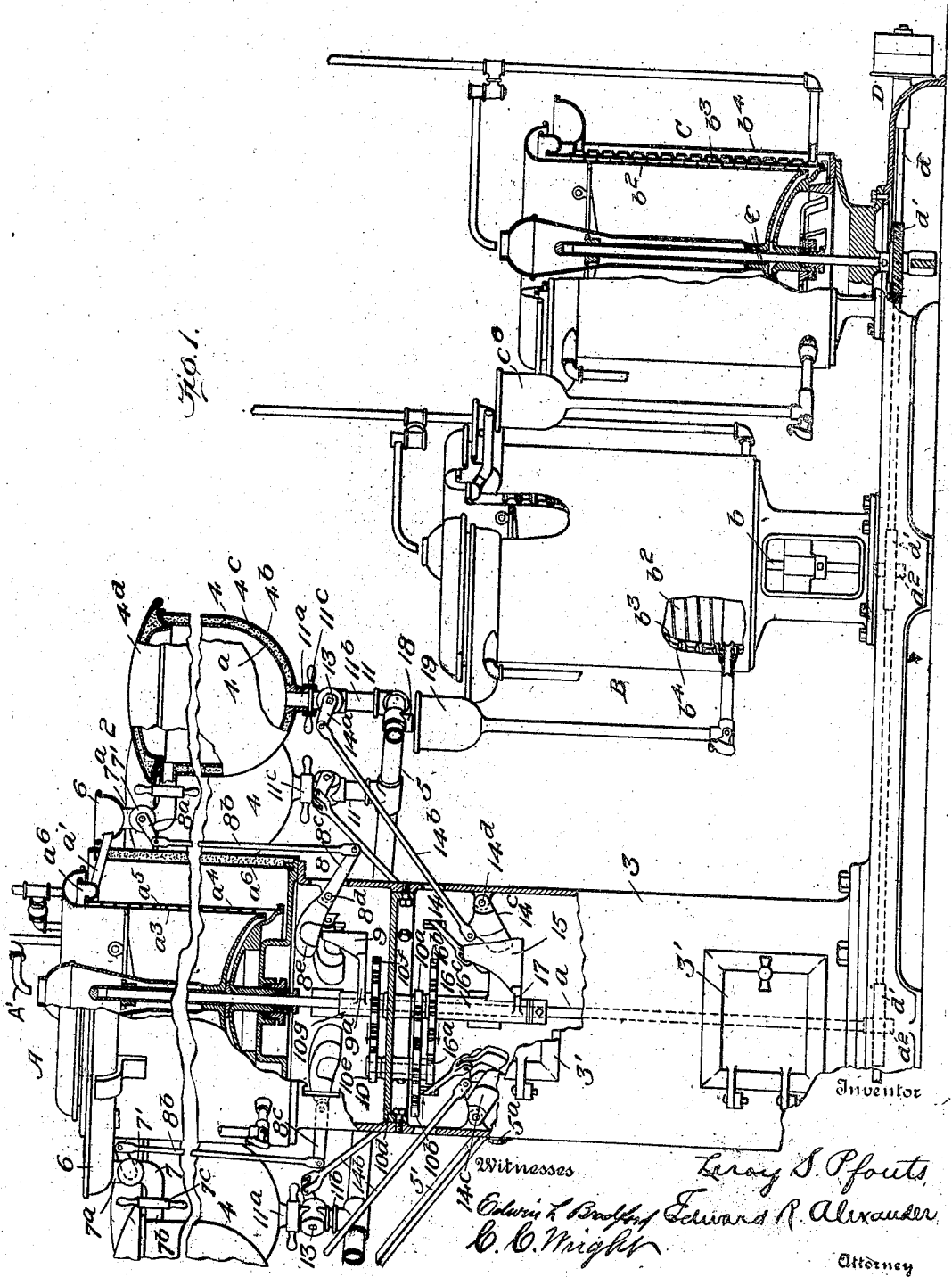

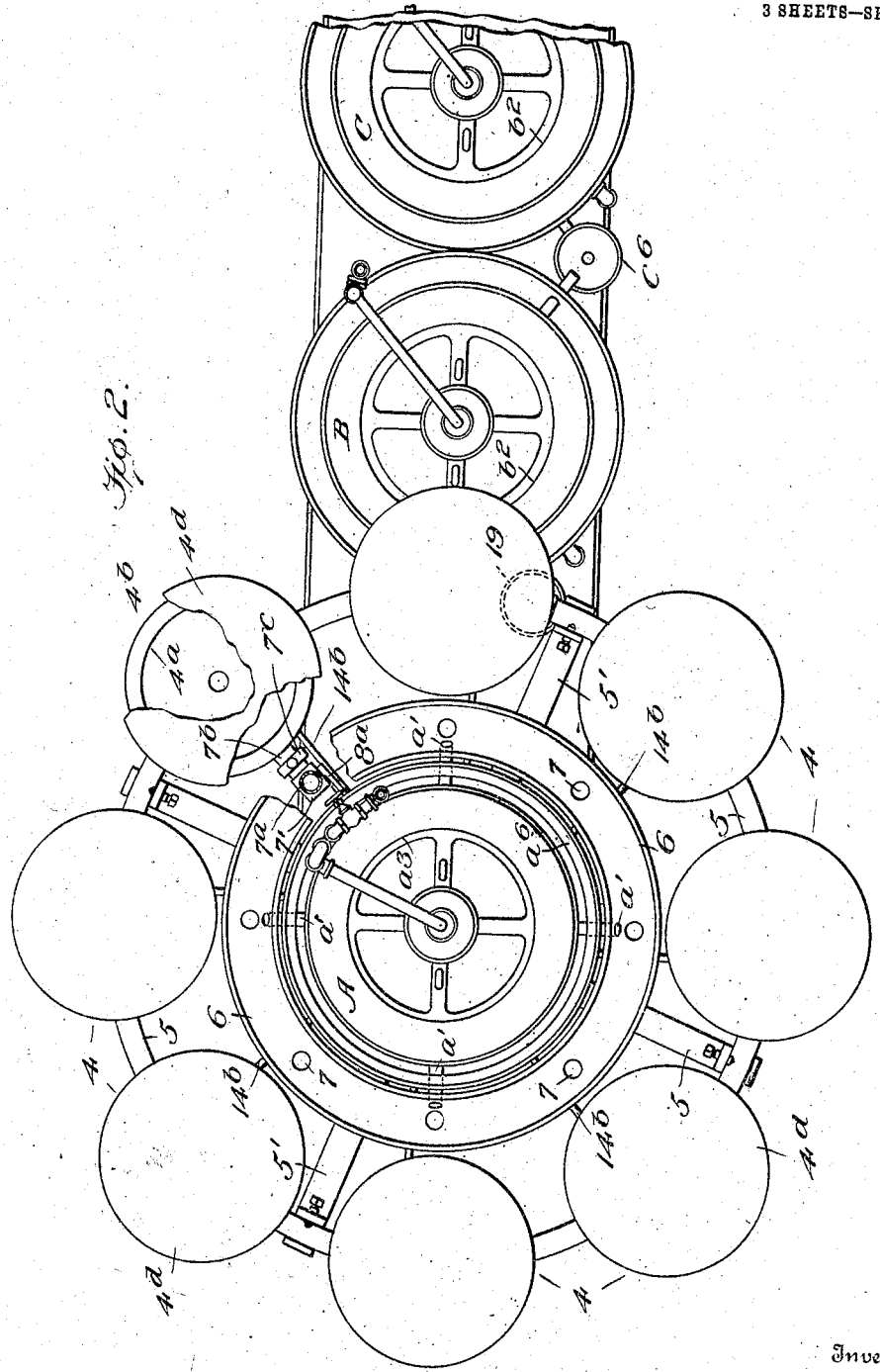

UNITED STATES PATENT OFFICE.

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

PASTEURIZER.

937,327.     Specification of Letters Patent.     Patented Oct. 19, 1909.

Application filed April 7, 1909. Serial No. 488,521.

*To all whom it may concern:*

Be it known that I, LEROY S. PFOUTS, a citizen of the United States, residing at Canton, in the county of Stark and State of Ohio, have invented certain new and useful Improvements in Pasteurizers, of which the following is a specification, reference being had therein to the accompanying drawings.

This invention relates to pasteurizing apparatus, and particularly to apparatus adapted to treat liquid, such as milk, in a continuous manner.

One object of the invention is to produce a pasteurizing apparatus or liquid distributing and holding system having a continuous flow of the liquid to and from the apparatus, adapted to thoroughly and uniformly treat each and every particle of the liquid.

Another object of the invention is to provide improved means for positively controlling the flow of the liquid through the pasteurizer, whereby each and every particle of the liquid is thoroughly treated.

Another object of the invention is to combine with a liquid treating apparatus, comprising a heater and a cooler, an improved holding mechanism for thoroughly treating the liquid and means for controlling the continuous flow of the liquid to and discharge from the said holding mechanism.

I have illustrated my invention in connection with a liquid treating apparatus such as shown and described in my application filed January 25th, 1909, Serial No. 474,128. It will be understood, however, that my improvements in liquid distributing mechanism for pasteurizing apparatus may be used in connection with a liquid treating apparatus of any suitable or preferred construction, and while the embodiment of the invention illustrated herein has been conformed to the general construction of apparatus shown in my said application, it may be adapted to suit any particular construction of apparatus is connection with which it is to be used.

Referring to the drawings: Figure 1 is a side elevation of an apparatus embodying my invention, parts being broken away to facilitate the description and illustration of the invention. Fig. 2 is a top plan view. Figs. 3, 4 and 5 are detail views.

In the drawings, A indicates a heater, B a preliminary cooler, and C a final cooler. D indicates a power mechanism comprising a main driving shaft $d$.

The heater A and coolers B and C are each provided with a shaft $a$, $b$, $c$, respectively, driven by gears or worms $d'$, $d^2$ connected respectively to the said shafts and the main shaft $d$ of the mechanism D.

The heater A comprises an inner rotary vessel $a^3$, connected with the driven shaft $a$ and adapted to hold a heating medium; an intermediate vessel $a^4$ surrounding the vessel $a^3$ and forming therewith a liquid film space $a^5$; and an outer vessel $a^6$, surrounding the inner and intermediate vessels $a^3$, $a^4$ and adapted to form with the outer walls of the latter vessel a chamber to receive a suitable heating medium. Each of the coolers B and C comprise an inner rotary vessel $b^2$, connected with the driven shafts $b$, $c$, respectively; an intermediate vessel $b^3$, and an outer vessel $b^4$. These vessels are constructed and arranged relatively to each other to form a liquid film space, and a space or chamber on opposite sides of the film space for a suitable cooling medium. These parts, to wit, the heater A, and coolers B and C and those features of construction coöperating therewith, are constructed, generally, and operate similarly to corresponding parts shown and described in the patent issued to John C. Miller on the 4th day of February, 1908, and numbered 878,225; and as the particular construction thereof forms no part of the present invention, further description of these parts will be omitted, as they are fully shown and described in the aforesaid patent, to which reference may be made.

2 indicates as a whole a liquid distributing and holding apparatus, preferably interposed between the heater A and preliminary cooler B.

The heater A, the distributing and holding apparatus 2, and the coolers B, C, respectively, are each supported in stepped relation to each other, so that the liquid will flow by gravity from the heater to the distributing and holding mechanism, and hence to the preliminary cooler and then to the final cooler. For this purpose the heater A is supported on a pedestal or casing 3 at a suitable height. The casing 3 may be provided with doors 3' to permit access to various parts of the apparatus.

The liquid distributing and holding apparatus 2 preferably comprises a series of independent or separated vessels 4, each comprising an inner receptacle 4ª and an outer receptacle 4ᵇ, and having an insulating jacket 4ᶜ. This jacket is shown to be filled with cork. Each of said vessels 4 is preferably provided with a detachable cover 4ᵈ. The vessels 4 are preferably arranged concentrically around the heater A, and supported in proper position relative thereto to permit the flow of the liquid from the heater to the vessels. One example of a suitable support for the holding vessels comprises an annular tubular base 5, extending around the heater A and a series of inclined arms or brackets 5′ carrying the base 5 at their outer ends and secured to the casing 3 at their inner ends by bolts 5ª. The said inner ends of the arms 5′ are preferably adjustably secured to the said casing, while the base 5 is detachably secured to the brackets so that the distributing and holding apparatus may be removed entirely from the heater for various purposes. The annular tubular base 5 may as hereinafter described, be used as a discharge conduit for liquid from the vessels 4.

6 indicates a circular liquid receiving trough, common to all the holding and distributing receptacles 4, and adapted to receive the liquid flowing from the upper end of the heater A through a discharge pipe a′. Preferably, there are a series of discharge pipes a′ arranged equi-distantly around the heater A in order to facilitate the flow of the liquid.

7 indicates delivery pipes, one for each of the vessels 4. One end of each pipe or duct 7 is connected with the common receiving trough 6, at or near its bottom, and its opposite end leads into the adjacent vessel 4. Preferably, the pipe 7 extends through the side walls of the vessel, near its upper end, so that nothing will interfere with the tight closing of the vessel by the cover 4ᵈ.

7′ indicates a valve interposed in each of the delivery pipes 7 for separately controlling the flow of the liquid to its respective vessel 4.

8 indicates valve operating mechanisms, one for each of the valves 7′. Each of the valve operating mechanisms 8 preferably comprises an oscillatable arm 8ª connected rigidly with the valve 7′, a link 8ᵇ pivotally connected at one end to the arm 8ª, and at the opposite end pivotally connected to a lever 8ᶜ. The lever 8ᶜ is fulcrumed at 8ᵈ to some suitable stationary part of the apparatus, such as the casing or pedestal 3. The casing 3 is preferably formed with a slot or opening through which the lever extends. The free end of the lever 8ᵈ is preferably weighted, as shown at 8ᵉ, in order that the valve may be normally held in one, preferably its closed, position. In the form of the invention illustrated, the free ends 8ᵉ of each of the levers 8ᶜ, extend within the casing and are arranged concentrically around the driven shaft a of the heater.

9 indicates a cam adapted to revolve about the shaft a and engage with each of the levers 8ᶜ successively. The cam 9 is carried by an arm 9ª which is fixed to and operated by a train of gears 10 adapted to be driven from the shaft a. Such gear mechanism is preferably of the intermittent rotary type and all the gears of the train are constructed and arranged relatively to each other whereby the speed of the shaft a communicated through the said gear train to the revolving arm 9ª is greatly reduced so that the cam 9 operates through the mechanism 8 each of the delivery valves 7′ successively at predetermined intervals, for instance once in twenty to thirty minutes.

The reducing gear mechanism 10 comprises a pinion 10ª, secured to the shaft a, and meshing with a gear 10ᵇ. This latter is fixed to a countershaft 10ᶜ which is mounted in suitable bearings in a plate 10ᵈ or other suitable support secured to the interior side walls of the casing 3.

10ᵉ indicates a pinion carried by the shaft 10ᶜ and meshing with a gear 10ᶠ fixed to a sleeve 10ᵍ which is loosely mounted on the shaft a. The arm 9ª is preferably fixed to the sleeve 10ᵍ.

11 indicates discharge pipes preferably leading from the bottom of each of the vessels 4, and each pipe 11 is connected to the annular conduit or base 5. This conduit 5 conveys the liquid to the preliminary cooler B.

13 indicates valves, one located in each of the pipes 11 and operating to control the discharge of the liquid from the adjacent vessel 4.

14 indicates valve operating mechanism one for each of the discharge valves 13. Each of the valve operating mechanisms 14 preferably comprises an arm 14ª rigidly secured to the adjacent valve 13, a link 14ᵇ pivotally connected at one end to the arm 14ª, and a lever 14ᶜ to which the opposite end of the link 14ᵇ is pivotally connected. The lever 14ᶜ is fulcrumed at 14ᵈ, preferably to the interior of the casing. The outer or free end of the lever 14ᶜ is preferably weighted so that the valve is held normally in one, preferably its closed, position. The weighted ends of the levers 14ᶜ are arranged concentrically about the shaft a and in the path of a revoluble cam 15 which operates each lever separately and successively.

The mechanism for revolving the cam 15 comprises an intermittent rotary gear train 16, and an arm 17 which carries the cam 15. The gear train 16 preferably comprises a pinion 16ª fixed to the countershaft 10ᶜ and a gear 16ᵇ with which the pinion 16ª meshes.

16ᶜ indicates a sleeve to which the gear

16$^b$ is fixed. The sleeve is loosely mounted on the shaft $a$ and has fixed to it the cam carrying arm 17.

18 indicates an outlet leading from the conduit 5 to a receiving receptacle 19 carried by the preliminary cooler B.

It will be understood that in a system of pasteurizing liquid in which the liquid is maintained at a pasteurizing temperature for a predetermined period, it is desirable to quickly and uniformly heat the liquid to the predetermined temperature, maintain the liquid at that temperature, for a certain definite length of time in order to destroy or render innocuous any germs or bacteria contained in the liquid, and finally to cool the liquid to a normal temperature; and that it is also desirable that these steps shall be carried out substantially continuously, that is, that there shall be a substantially continuous flow of the liquid to and through the apparatus, and a substantially continuous discharge therefrom. These advantageous results are all accomplished in the apparatus herein described and illustrated, as will be more fully understood from the following described operation: The liquid is delivered to a receiving tank having a discharge pipe A', which operates as a supply means and from which it flows by gravity to the heater A. In passing through the heater the liquid is suddenly and uniformly raised to the desired temperature and is delivered to the trough $a^6$. From the trough $a^6$ the liquid is discharged by means of the outlets $a'$ into the common receiving trough 6. As the cam 9 for the delivery or feed valve operating mechanism revolves about the shaft $a$, it engages with and raises and lowers each of the levers 8$^c$ successively. This operation of each lever opens and closes the valve 7' connected therewith for a period of time necessary to allow liquid to flow by gravity into and to fill the adjacent communicating vessel 4. As the cam 9 intermittently moves around the shaft $a$ it will be readily understood that during one complete revolution of said cam each of the valves 7' in a given succession is opened and closed and the adjacent communicating vessel filled. The discharge valve operating cam 15 controls the discharge of the liquid from the vessels 4, by opening and closing the discharge valves 13, similarly to the cam 9, and its operating mechanisms 8, for opening and closing the inlet valves. The cam 15 is revolved at the same rate of speed as the cam 9 and is set or stepped ahead of the cam 9 in order that each of the vessels 4 may be emptied successively and in advance of the operation of the valves 7' for the refilling thereof.

From the above description and operation it will be seen that the vessels 4 are filled successively and emptied successively, and that each vessel remains filled with the liquid for a predetermined length of time, dependent upon the speed of rotation of the cams 9 and 15 and the angular distance between them. The speed of the cams may be regulated in various ways, as by substituting gears of different relative sizes, or by adjusting the position of either one of the cams on the circumference of the circle it describes so that the discharge valves will operate sooner or later after the operation of the delivery or inlet valves, respectively.

As shown in the drawings, each of the delivery pipes 7 is formed of two parts 7$^a$, 7$^b$ and joined together by a coupling 7$^c$; likewise the outlet pipes 11 each comprise two pipes 11$^a$, 11$^b$ connected by a coupling 11$^c$. By this construction each of the vessels 4 and all of the piping may be quickly and readily disconnected for cleaning.

From each of the vessels 4 the treated liquid flows by gravity into the angular tubular base 5 and thence flows by gravity into the receiving hopper 19 of the preliminary cooler B. It is conveyed through this cooler in the well known manner and delivered from it into the receiving hopper $c^6$ into the final cooler C.

I am aware of the fact that it has been heretofore proposed to provide apparatus for treating or pasteurizing milk, cream or other liquids in which the milk was heated to a pasteurizing temperature while flowing continuously, was then maintained at the pasteurizing temperature for a sufficient period of time to destroy or render innocuous the bacteria without cooking the albumen in the milk, and without the discontinuing of the flow of the milk while being heated, and then cooling the milk, as for example is disclosed in Letters Patent of the United States No. 684,319 to Frederick G. Shortt, and I do not lay any claim broadly to a process of treating milk or other liquids and to apparatus such as set forth and disclosed in the said Shortt patent. On the contrary, I have sought to provide improved apparatus for the treating of milk or other liquids by first heating it to a pasteurizing temperature, then holding it at that temperature for a predetermined time, and then cooling it.

To those skilled in the art of making apparatus of the class described, many alterations in construction and widely differing embodiments and applications of my invention will suggest themselves, without departing from the spirit and scope thereof. My disclosures and the description therein are purely illustrative and are not intended to be in any sense limiting.

What I claim is:

1. In a pasteurizing apparatus, the combination of means for receiving and holding a plurality of charges of liquid, a liquid receiving trough common to all said receiving and holding vessels, means including valves for controlling the flow of the liquid from the trough, to the receiving and holding means, and means for controlling the discharge of the liquid from the said receiving and holding means.

2. In a pasteurizing apparatus, the combination of a series of vessels, a liquid receiving trough common to the said vessels, delivery pipes, one for each vessel, leading from said trough, means for controlling the flow of the liquid through the pipes to the vessels successively, and means for controlling the discharge from the said vessels successively.

3. In a pasteurizing apparatus, the combination of a series of liquid holding vessels, a delivery pipe for each of the vessels, a trough common to all the pipes, a mechanism for controlling the flow of the liquid through each pipe, means for automatically operating each of the said mechanisms successively, and means for discharging the liquid from the vessels.

4. In a pasteurizing apparatus, the combination of a series of liquid holding vessels, a delivery pipe for each of the vessels, a trough common to all the pipes, a mechanism for controlling the flow of the liquid through each pipe, revoluble means for automatically operating each of the said mechanisms successively, and means for discharging the liquid from the vessels.

5. In a pasteurizing apparatus, the combination of a series of liquid holding vessels, a delivery pipe for each of the vessels, a trough common to all the pipes, a mechanism for controlling the flow of the liquid through each pipe, a cam for automatically operating each of the said mechanisms successively, and means for discharging the liquid from the vessels.

In a pasteurizing apparatus, the combination of a series of liquid holding vessels, a delivery pipe for each of the vessels, mechanism for controlling the flow of a liquid through each of said pipes, including a lever, a movable means for operating each of the said levers successively, and means controlling the discharge of each of the said vessels.

7. In a pasteurizing apparatus, the combination of a series of liquid holding vessels, a delivery pipe for each of the vessels, mechanism for controlling the flow of a liquid through each of said pipes, including a lever, all of the said levers being arranged in a circular series, and revolving means for engaging with and operating each of the levers successively, and means for controlling the discharge of the liquid from each of the said vessels.

8. In a pasteurizing apparatus, the combination of a series of liquid holding vessels, a delivery pipe for each of the vessels, mechanism for controlling the flow of a liquid through each of said pipes, including a lever, all of the said levers being arranged in a circular series, and a revolving cam for engaging with and operating each of the levers successively, and means for controlling the discharge of the liquid from each of the said vessels.

9. In a pasteurizing apparatus, the combination of a liquid supply means, a heating apparatus, a holding apparatus comprising a plurality of vessels arranged in series around said heating apparatus, and a cooling apparatus, the said heating, holding and cooling apparatus being arranged in stepped relation to each other, respectively, whereby the liquid flows from one to the other by gravity.

10. In a pasteurizing apparatus, the combination of a heater having a rotating member, a driven shaft therefor, a liquid holding apparatus comprising a series of vessels, means for automatically controlling the flow of a liquid to each of the said vessels, separate means for discharging the liquid from each of said vessels, and reducing gear mechanism interposed between the driven shaft and the said liquid control means and the liquid discharge means.

11. In a pasteurizing apparatus, the combination of a heater, a series of liquid holding vessels arranged concentrically about the heater, a delivery pipe leading to each of the said vessels, a driven shaft and means operated by the driven shaft for controlling the flow of a liquid through each of said pipes, and means for discharging the liquid from each of the vessels.

12. In a pasteurizing apparatus, the combination of a heater, a series of liquid holding vessels arranged concentrically about the heater, a liquid receiving trough surrounding the heater, a delivery pipe leading from the trough to each of the said vessels, automatically operating means for controlling the flow of the liquid through each of the said delivery pipes successively, and means for controlling the automatic discharge of each of said vessels.

13. In a pasteurizing apparatus, the combination of a heater, a series of liquid holding vessels arranged concentrically about the heater, a liquid receiving trough surrounding the heater, a delivery pipe leading from the trough to each of the said vessels, a valve located in each of said pipes, means for automatically controlling each of said valves, and means for controlling the automatic discharge of each of said vessels.

14. In a pasteurizing apparatus, the combination of a heater, a series of liquid holding vessels arranged concentrically about the heater, a liquid receiving trough surrounding the heater, a delivery pipe leading from the trough to each of the said vessels, a valve located in each of said pipes, a gear mechanism, and connections between the gear mechanism and each of said valves for automatically operating the latter, and means for discharging each of said vessels.

15. In a pasteurizing apparatus, the combination of a series of liquid holding vessels, a receiving trough, a delivery pipe leading from said trough to each of said receptacles, a valve located in each of said delivery pipes, means for automatically operating the said valves successively, and means for controlling the discharge of a liquid from each of the said vessels.

16. In a pasteurizing apparatus, the combination of a series of liquid holding vessels, a receiving trough, a delivery pipe leading from said trough to each of said receptacles, a valve located in each of said delivery pipes, a driven shaft, a valve control mechanism for each valve, and a cam revolved by the said driven shaft for operating the valve control mechanism, and means automatically controlling the discharge from each vessel.

17. In a pasteurizing apparatus, the combination of a series of liquid holding vessels, means for supporting said vessels in series, means for automatically filling each of said vessels successively, means for automatically emptying the said vessels, and means permitting each of said vessels to be independently removed from said series relationship.

18. In a pasteurizing apparatus, the combination of a series of liquid holding vessels adapted to be filled and emptied successively, means for supporting said vessels in series, a liquid receiving trough, a delivery pipe leading from the trough to each of the said vessels, an outlet pipe leading from each of said vessels, each delivery pipe and each outlet pipe being formed in two parts, and a coupling for uniting the two parts of each of said pipes.

19. In a pasteurizing apparatus, the combination of a heater having a rotatable liquid treating wall over which the liquid travels in a relatively attenuated stream or film, means for rotating said wall, a holding vessel arranged to receive the liquid after it leaves said treating wall, valve mechanism for controlling the discharge of liquid from said holding vessel, and operating mechanism for said valve mechanism interposed between said valve mechanism and said rotating means for the liquid treating wall.

20. In a pasteurizing apparatus, the combination of a heater having a rotatable liquid treating wall over which the liquid travels in a relatively attenuated stream or film, means for rotating said wall, a holding vessel arranged to receive the liquid after it leaves said treating wall, valve mechanism for controlling the flow of treated liquid from said treating wall to said holding vessel, valve mechanism for controlling the discharge of liquid from said holding vessel, and operating mechanism for said valve mechanism interposed between said valve mechanism and said rotating means for the liquid treating wall.

21. In a pasteurizing apparatus, the combination of a heater having a rotatable liquid treating wall over which the liquid travels in a relatively attenuated stream or film, means for rotating said wall, means for uniformly heating the liquid while it is traveling along said treating wall, a holding vessel arranged to receive the liquid after it leaves said treating wall, valve mechanism for controlling the discharge of liquid from said holding vessel, and operating mechanism for said valve mechanism interposed between said valve mechanism and said rotating means for the liquid treating wall.

22. In a pasteurizing apparatus, the combination of a heater having a rotatable liquid treating wall over which the liquid travels in a relatively attenuated stream or film, means for rotating said wall, means for uniformly heating the liquid while it is traveling along said treating wall, a holding vessel arranged to receive the liquid after it leaves said treating wall, valve mechanism for controlling the flow of treated liquid from said treating wall to said holding vessel, valve mechanism for controlling the discharge of liquid from said holding vessel, and operating mechanism for said first mentioned valve mechanism interposed between said valve mechanism and said rotating means for the liquid treating wall.

23. In a pasteurizing apparatus, the combination of a plurality of receiving and holding vessels, means for controlling the delivery of liquid to said vessels one after the other, means for automatically discharging said vessels one after the other and after each of said vessels has held its charge for a predetermined period of time, and means for adjusting the delivery controlling means or the discharging means one relatively to the other for regulating the time of discharge of each vessel relatively to the time when it was filled.

In testimony whereof I affix my signature in the presence of two witnesses.

LEROY S. PFOUTS.

Witnesses:
SYLVIA BORON,
WILLIAM H. MILLER.